(No Model.)
D. W. HOVEY.
CUTTING APPARATUS FOR HARVESTERS.
No. 318,745. Patented May 26, 1885.
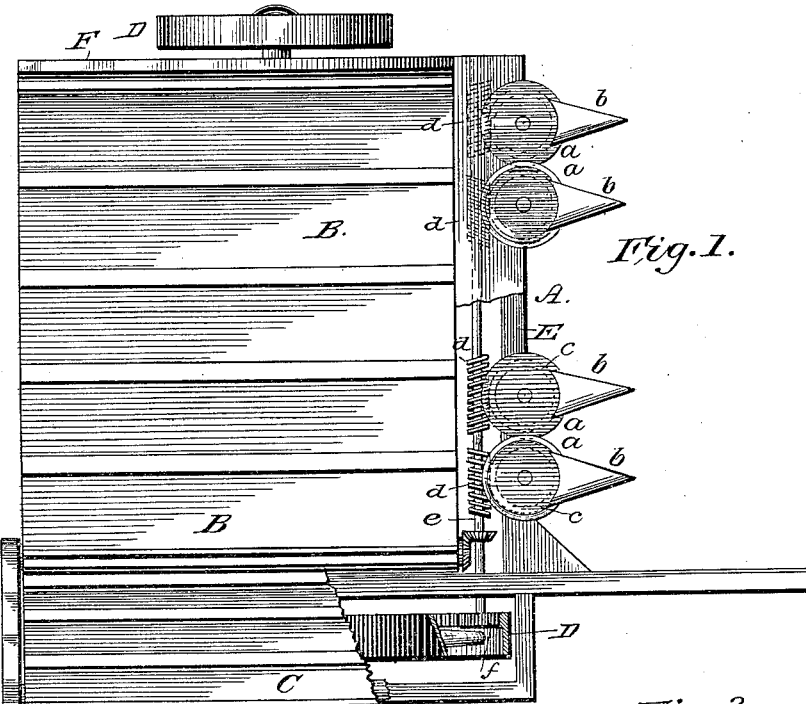
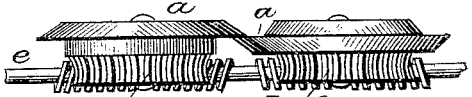
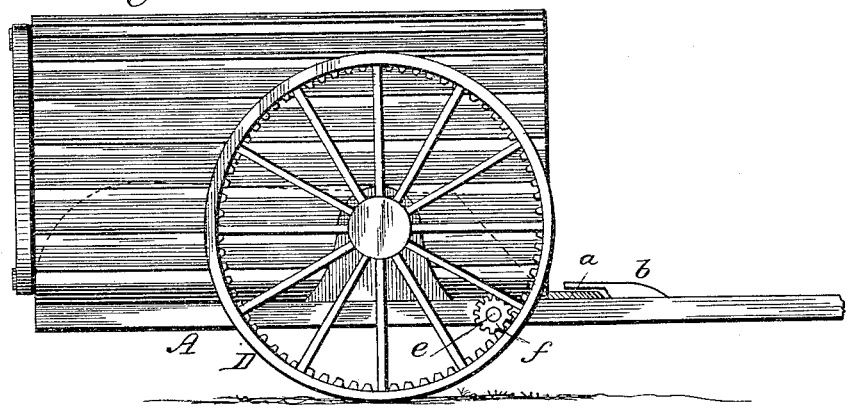
WITNESSES:
Fred G. Dieterich
W. K. Stevens.
INVENTOR:
Dana W. Hovey
BY Munn & Co
ATTORNEYS.

UNITED STATES PATENT OFFICE.

DANA W. HOVEY, OF WINTHROP, IOWA.

CUTTING APPARATUS FOR HARVESTERS.

SPECIFICATION forming part of Letters Patent No. 318,745, dated May 26, 1885.

Application filed February 14, 1884. (No model.)

*To all whom it may concern:*

Be it known that I, DANA W. HOVEY, a citizen of the United States, residing at Winthrop, in the county of Buchanan and State of Iowa, have invented certain new and useful Improvements in Cutting Apparatus for Harvesters, of which the following is a description.

This invention relates to that class of harvesters which is drawn across fields to cut standing grain and to bind it into bundles; and it has for its object more particularly the cutting and binding of large-stalked grain, such as common corn, broom-corn, cane, &c.

To this end my invention consists in the construction and combination of parts forming a harvester, hereinafter described and claimed, reference being had to the accompanying drawings, in which—

Figure 1 is a plan view of my invention. Fig. 2 is a side elevation of the same, and Fig. 3 is a front view of a portion of the cutting parts.

A represents the body of the machine in the form of a harvester-platform mounted on wheels D, and provided with the usual carrying-belt, B, and binding device at C. These are not shown in detail, as they form no part of my invention, but are associated therewith as accessories.

The kinds of grain—such as corn—for which this invention is especially adapted are usually grown in rows, and this harvester may be adapted to gather any suitable number of rows at each advance along them. I have shown cutters $a$ for gathering two rows at once. These cutters $a$ are circular steel blades journaled on studs of the finger-bar E, and provided with any suitable edges, either smooth, serrated, or toothed; and the two cutters of each pair work together, like shears, one faced upward and the other faced downward, lapping a little over its edge. The front edges of these cutters may be protected by guard-fingers $b$, secured, as usual, to a finger-bar, E. Each cutter $a$ is provided with a worm-wheel, $c$, secured to its under side. These gear-wheels are engaged by worms $d$ on a shaft, $e$. This shaft is provided with a pinion-wheel, $f$, which engages an internal gear in the main drive-wheel D, and is propelled thereby when the machine is advanced on the ground. Thus the cutters will be revolved by the advance of the machine, and the stalks of the grain will be in a manner sawed off, falling on the apron B, by which they are carried to the binder C and bound into bundles and dropped, as usual. The inner wheel D is provided with a vertical guard, F, to keep the stalks from being entangled in it. One of the worms $d$ is right-handed and the other left, in each pair, so that the cutters will be both rotated in the direction to meet at their edges, so as to draw in the stalks.

What I claim as my invention, and wish to secure by Letters Patent, is—

1. The combination, with a pair of circular cutters, of worm-wheels, one secured to each cutter, and two worms upon the same shaft engaging said worm-wheels, one worm being right-handed and the other left, as shown and described.

2. The combination, with the circular cutters $a$, guards $b$, and bar E, of the shaft $e$, worms $d$, gear $f$, drive-wheel D, and worm-wheels $c$, substantially as shown and described.

DANA W. HOVEY.

Witnesses:
JARED PAHNETIN,
W. WOODWORTH.